No. 704,057. Patented July 8, 1902.
H. LIETHEGENER.
EXPANSIBLE BORING TOOL.
(Application filed Oct. 21, 1901.)
(No Model.)
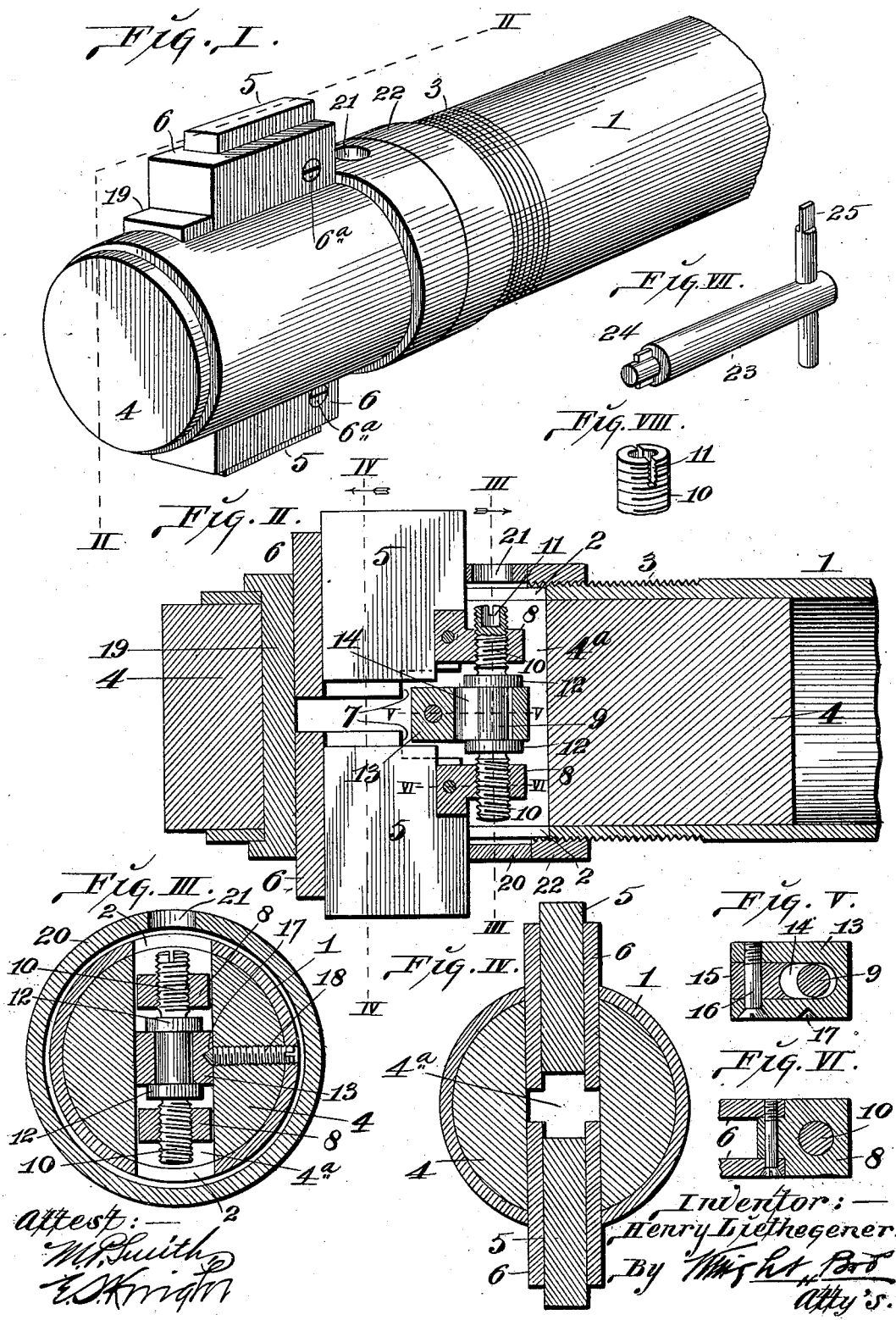
Inventor:—
Henry Liethegener.

UNITED STATES PATENT OFFICE.

HENRY LIETHEGENER, OF ST. LOUIS, MISSOURI, ASSIGNOR TO SANDFORD NORTHROP, OF ST. LOUIS, MISSOURI.

EXPANSIBLE BORING-TOOL.

SPECIFICATION forming part of Letters Patent No. 704,057, dated July 8, 1902.

Application filed October 21, 1901. Serial No. 79,391. (No model.)

*To all whom it may concern:*

Be it known that I, HENRY LIETHEGENER, a citizen of the United States, residing in the city of St. Louis, in the State of Missouri, have invented certain new and useful Improvements in Expansible Boring-Tools, of which the following is a full, clear, and exact description, reference being had to the accompanying drawings, forming part of this specification.

My invention relates to that class of cutters or reamers used for boring or reaming out flues or other hollow articles; and the invention consists in features of novelty hereinafter fully described, and pointed out in the claim.

Figure I is a perspective view of my boring-tool. Fig. II is a longitudinal sectional view taken on line II II, Fig. I. Fig. III is a cross-sectional view taken on line III III, Fig. II. Fig. IV is a cross-sectional view taken on the line IV IV, Fig. II. Fig. V is a cross-sectional view taken on the line V V, Fig. II, through the adjustment-screw-rod holding-collar. Fig. VI is a sectional view taken on the line VI VI, Fig. II, through one of the cutter-carrier blocks. Fig. VII is a perspective view of an implement used in adjusting the parts of the tool. Fig. VIII is a detail perspective view of the screw-socket end of the adjustment-rod.

1 designates a shank preferably of tubular form and provided with a slot 2, extending transversely therethrough. At the rear of the slot 2 the shank 1 has a thread 3 upon the exterior thereof.

4 is a core seated in the shank 1 and provided with a slot 4ª coincident with the slot 2 in said shank.

5 designates cutters of approximately rectangular shape loosely seated in socket-holders 6, that are movably positioned in the slots 2 and 4ª of the shank 1 and core 4, the said socket-holders being notched at 7 and having connected to them carrier-blocks 8. One of the carrier-blocks is provided interiorly with a right-hand thread and the other is provided interiorly with a left-hand thread.

9 designates an adjustment-rod provided at one end with a right-hand screw 10 and at the opposite end with a left-hand screw 10, each of said screws being seated in one of the socket-holder-carrier blocks 8, whereby upon rotation of said adjustment-rod the carrier-blocks 8 and the socket-holders 6, carried thereby, may be moved to or from each other uniformly, according to the direction in which the adjustment-rod is turned. One end of the adjustment-rod contains a key-receiving socket 11 to provide for the manipulation of the adjustment-rod.

Rigid with the adjustment-rod and spaced apart thereon are annular rims 12, and loosely positioned between said annular rims is a collar 13, that is provided with a slot 14, which receives the central portion of said adjustment-rod. In order to permit of the ready application of the collar 13 to the adjustment-rod, the collar is slotted at one end thereof, and a portion of said slot is closed by a plug 15, held in place by a screw 16, that passes through the collar and plug. The collar 13 is maintained in a central position in the core 4 by a set-screw 18, that passes through the shank 1 and core and seats in a recess 17 contained by the collar, whereby the collar is firmly held in the slot 4ª. This arrangement provides for the ready release of the collar by the withdrawal of said set-screw when it is desired to lift the cutter-holders out of the shank and core. The notching of the cutter-holders provides for their being brought close together at their inner ends by reason of the notches receiving the collar 13. By providing the slot 14 in the collar 13 lateral movement of the adjustment-rod 9 is permitted within said collar in order that cutter-socket holders and cutters of varying widths may be utilized, inasmuch as the said adjustment-rod may be moved in the collar according to the width of the cutter-holders.

19 is a key seated in the slots 2 and 4ª, against which the outer edges of the socket-cutter holders 6 are adapted to bear while held thereto by a follower-ring 20 and set-ring 22. The set-ring 22 is interiorly screw-threaded to fit the screw-thread 3 of the shank 1 and is adapted to be turned on said shank to carry the follower-ring 20 forwardly to bind against the socket-holders 6 and the cutters 5 therein, whereby said holders and cutters are held firmly between said follower-ring and the key 19 after they have been set in the proper position by the manipulation of the adjustment-rod 9.

In Fig. VII, I have shown an implement 23 suitable for use in turning the adjustment-rod 9, said implement having a key 24, that may be inserted through the aperture 21 in the follower-ring 20 and into the screw-socket 11 for the purpose of turning the adjustment-rod 9 in moving the cutter-holders 6 inwardly and outwardly, as desired. The implement is also provided at one end of its handle with a screw-driver point 25, by which the set-screw 18 may be turned to release or hold the collar 13.

In order to adjustably hold the cutters in the cutter-holders 6, I provide set-screws 6ª, seated in the cutter-holders and adapted to bear against the cutters and hold them in any position desired. By this means the cutters may be moved outwardly to any desired extent as they become worn away or previous to any wear and be securely retained when so adjusted.

I claim as my invention—

In a boring-tool, the combination of a shank, a pair of cutter-holders movably located in said shank, carrier-blocks connected to said cutter-holders, an adjustment-rod having right and left screws seated in said carrier-blocks, a collar loosely fitted to said adjustment-rod, and a set-screw by which said collar is removably held, substantially as described.

HENRY LIETHEGENER.

In presence of—
  E. S. KNIGHT,
  M. P. SMITH.